Oct. 2, 1962 P. G. KUIPERS 3,056,919
MEASURING APPARATUS
Filed May 8, 1958 2 Sheets-Sheet 1

INVENTOR
PIETER GEERT KUIPERS

BY
AGENT

United States Patent Office 3,056,919
Patented Oct. 2, 1962

3,056,919
MEASURING APPARATUS
Pieter Geert Kuipers, Eindhoven, Netherlands, assignor to North American Philips Company, Inc., New York, N.Y., a corporation of Delaware
Filed May 8, 1958, Ser. No. 733,956
Claims priority, application Netherlands May 22, 1957
8 Claims. (Cl. 324—30)

This invention relates to measuring apparatus in which a quantity to be measured appears in the form of a resistance variation and the quotient of this resistance and of another resistance is measured, the first resistance being connected, in series with an auxiliary alternating voltage supply, between the input terminals of an amplifier provided with negative feedback the output voltage of which is measured, if required, after further amplification.

It is an object of the present invention to provide such apparatus in which the scale graduation of the measuring instrument is in linear relationship with the conductivity of the resistance element in the input circuit. It is a further object of the invention to render the apparatus suitable for a number of measuring ranges, the linearity being maintained in all these ranges.

The invention consists in that the second resistance is included, in series with an impedance across which the output voltage or a voltage proportional thereto is set up, in the feed-back circuit connected between the input terminals of the amplifier.

In order to eliminate as far as possible the influence of stray capacitances and leakage resistances, the first-mentioned resistances and conductivities are provided in a particular manner, the input circuit preferably comprising an inductance coil to which the measuring alternating voltage is applied inductively and the first resistance. The feed-back circuit comprises a second inductance inductively coupled to the output circuit and the second resistance, the ends of the resistances not connected to the said inductances being connected to a point of constant potential (earth).

Preferably the measuring alternating voltage is supplied, and the current to be measured is conducted away, by means of doubly screened transformers. One of the screens of each transformer is directly connected to ground while the other screens are connected to the input electrode of the amplifier.

In order to enable the measuring range to be changed over, the second resistance is made interchangeable.

The invention relates more particularly to apparatus suitable for measuring the specific conductivity of electrolytes. If the second resistance is a so-called reference cell, that is to say, a measuring cell filled with a liquid the properties of which correspond to those of the liquid to be measured and which is exposed to the same temperature conditions, automatic temperature compensation is obtained.

Figure 1:
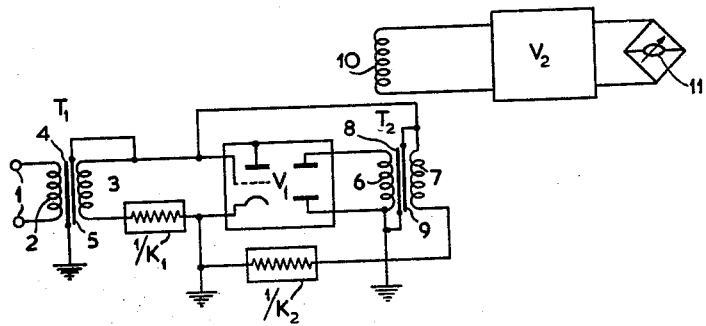
Figure 2:
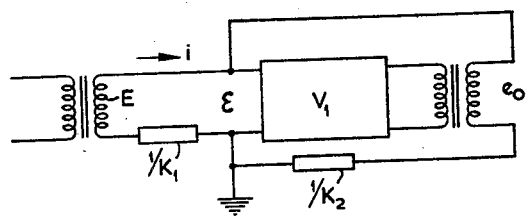
Figure 3:
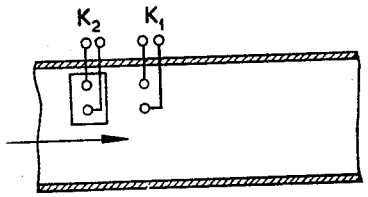
Figure 4:
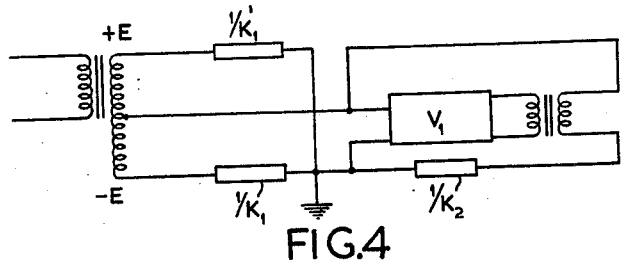
Figure 5:
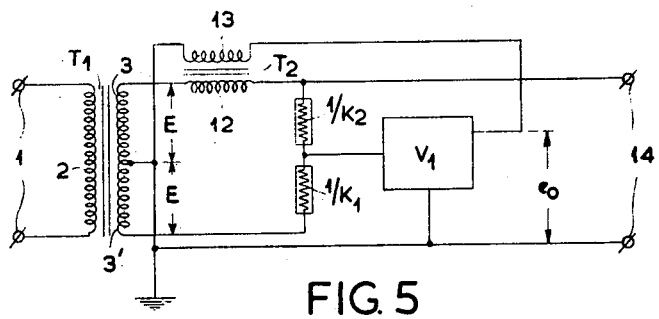
Figure 6:
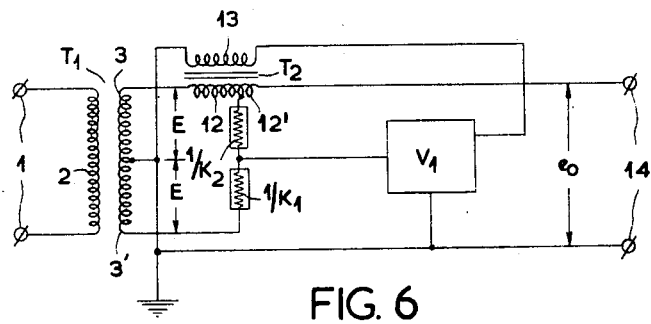

In order that the invention may readily be carried into effect, it will now be described, by way of example, with reference to the accompanying drawings, wherein: FIG. 1 is an embodiment of the circuit arrangement of the present invention; FIG. 2 is a simplified circuit diagram of the embodiment of FIG. 1; FIG. 3 is a schematic diagram of a portion of an arrangement for measuring the conductivity of an electrolyte; FIG. 4 is a schematic diagram of another embodiment of a circuit arrangement of the present invention; FIG. 5 is a schematic diagram of another embodiment of the circuit of the invention; and FIG. 6 is a modification of the embodiment of FIG. 5.

In FIG. 1 an oscillator (not shown) supplies a measuring voltage to the terminals 1; the frequency of which voltage may be from 80 c./s. to 1000 c./s. By means of a transformer T1 comprising windings 2 and 3 and screens 4 and 5 the measuring voltage is transmitted to the input circuit of an amplifier V1. The input circuit of this amplifier further contains an element having a resistance $1/K_1$ connected in series with the winding 3.

The output stage of the amplifier may be a push-pull stage which is connected to the primary winding 6 of a transformer T2. This transformer has two secondary windings of which one winding 7 is doubly screened from the primary winding by screens 8 and 9. The winding 7 acts to provide the negative feedback and is connected in series with an element having a resistance $1/K_2$ between the input terminals of the amplifier V1. A second secondary winding 10 is connected to a second amplifier V2 the output current of which is rectified by means of a full-wave rectifier circuit. The resulting direct current is measured by means of a direct-current instrument 11.

As FIG. 1, the resistances $1/K_1$ and $1/K_2$ are connected so that their junction may be grounded. Thus, capacitive influences are substantially eliminated. This elimination is assisted in by the screening arrangements 4 and 5, and 8 and 9, one screen of which in each transformer is connected to ground while the others are connected to the input electrode of the amplifier.

The operation of the circuit arrangement can be described more fully with reference to the simplifier circuit arrangement shown in FIG. 2. The input voltage can be written:

$$E = \left(\frac{1}{K_1} + \frac{1}{K_2}\right)i - \mu\epsilon$$

In addition, $$\epsilon = E - \frac{i}{K_1}$$

From this it follows that $$E = \left(\frac{1}{K_1} + \frac{1}{K_2} + \mu\frac{1}{K_1}\right)i - \mu E$$

and if $$(1+\mu)\frac{1}{K_1} \gg \frac{1}{K_2}$$

then $$e_0 = \frac{-i}{K_2} = \frac{-K_1}{K_2} \cdot E$$

From this it follows that the output voltage is in linear relationship with the conductivity $K_1$.

Thus, the conductivity $K_1$ can be determined if $K_2$ is a known conductivity. By using for $K_2$ a number of interchangeable elements a series of measuring ranges is obtainable, the indication being in linear relationship with the conductivity $K_1$ in all these ranges.

The described apparatus is highly suited to measuring the conductivity of electrolytes with temperature compensation. In this event, as the conductivity $K_2$ there is used a reference cell, that is to say, a conductivity cell having the same properties as the cell used for $K_1$, which is immersed in the liquid the specific conductivity of which is to be recorded over a certain period of time. The cell taking the place of $K_2$ is filled with a liquid of the same nature as the liquid to be measured and is exposed to the same temperature conditions. It is, for example, arranged adjacent the cell $K_1$ in the liquid to be measured, but naturally separated from this liquid. The arrangement of the cells in a pipe is shown in FIG. 3. With respect to the direction of flow the reference cell is located in front of the measuring cell so that the time delay for the former cell is kept to a minimum.

It can be assumed that the temperatures of the two cells and also the resistance coefficients of the conductivities are substantially the same at all times. The factor $1+\alpha t$ ($\alpha$=the temperature coefficient of the conductivity and $t$=the temperature) which indicates the variation of the conductivity with temperature, is eliminated in this manner.

In some cases it may be desirable for the difference of two conductivities to be measured. For this purpose use can be made of the circuit arrangement shown in FIG. 4, in which the secondary of the input transformer has a center tap and a voltage is supplied to the measuring cells in phase opposition. The input voltage of the amplifier is proportional to the difference of the currents passing through the cells.

For the output voltage we find:

$$e_0 = \frac{-E}{K_2}(K_1' - K_1)$$

FIGS. 5 and 6 show modified arrangements in which the screening can be simplified.

In FIG. 5 the secondary winding of the transformer $T_1$ comprises two equal parts 3 and 3'. A center tap on the secondary winding is connected to ground. The secondary transformer winding together with a winding 12 and resistances $1/K_1$ and $1/K_2$ forms a closed circuit. The winding 12 is coupled to a winding 13 which is connected between the non-grounded output terminal of the amplifier and ground. The junction of the resistances is connected to the non-grounded input terminal of the amplifier. The output voltage is taken from terminals 14 and is measured, for example, after rectification.

A simple calculation shows that the output voltage is given by the relation $$e_0 = \frac{K_1}{K_2}E$$

provided that the product of the first resistance and the amplification factor is large as compared with the sum of the two resistances.

Here also there is a linear relationship between the conductivity of the measuring cell and the output voltage when the input voltage is kept constant.

Since the secondary of the first transformer and the primary of the second transformer are both connected to ground, no screens need be used between the windings.

Generally the cells are connected in the bridge circuit shown through cables. However, the cable capacitances exert a slight influence only on the measurement since the internal impedances of the secondary transformer windings are very low.

FIG. 6 shows an embodiment which enables an even better linearity to be obtained. In this embodiment, the secondary of the feed-back transformer comprises two parts 12 and 12', the number of turns of the former being about four times that of the latter. The series connection of the resistances is connected to the junction. The amplification is less than in the previous case.

The circuit arrangements described are very suitable for conductometric titration, in which event the two resistances have about equal values. The voltage across the primary 13 of the transformer $T_2$ is given by:

$$n \cdot E \cdot \left(\frac{R_2}{R_1} - 1\right)$$

($n$=tranformation ratio.)

The sensitivity of the tube voltmeter by means of which this voltage is measured is comparatively high, so that small variations of $K_2/K_1$ can be shown.

What is claimed is:

1. A circuit arrangement for measuring a variation in a first resistance, comprising an amplifier having an input circuit, an output circuit and a negative feedback connection between said input circuit and said output circuit, said input circuit having a pair of input terminals, means for supplying an alternating voltage to said input circuit, said voltage supplying means comprising an input transformer having a secondary winding portion, means connecting said first resistance in series with said secondary winding portion between said input terminals, impedance means for deriving an output voltage from said output circuit, said impedance means comprising a feedback transformer having a secondary winding portion, a second resistance, means connecting said second resistance in series with said feedback secondary winding portion in said negative feedback connection between said input terminals, means connecting the ends of said resistances not connected to said winding portions to a point at constant potential, a first double screen for said input secondary winding portion, and a second double screen for said feedback secondary winding portion, one of the screens of each of said double screens being connected to a point at constant potential and the other of the screens of each of said double screens being connected to a point in said input circuit.

2. A circuit arrangement for measuring the conductivity of a first electrolyte, comprising an amplifier having an input circuit, an output circuit and a negative feedback connection between said input circuit and said output circuit, said input circuit having a pair of input terminals, first pair of spaced electrodes immersed in said electrolyte in a manner whereby the said electrolyte provides an electrical resistance between said first pair of electrodes, means for supplying and alternating voltage to said input circuit, means connecting said first pair of electrodes in series with said voltage supply means between said input terminals, impedance means for deriving an output voltage from said output circuit, a second electrolyte having the same properties as said first electrolyte and maintained at substantially the same temperature as that of said first electrolyte, a second pair of spaced electrodes immersed in said second electrolyte in a manner whereby the said second electrolyte provides an electrical resistance between said second pair of electrodes, and means connecting said second pair of electrodes in series with said voltage deriving means in said negative feedback connection between said input terminals.

3. A circuit arrangement for measuring the conductivity of a first electrolyte, comprising an amplifier having an input circuit, and output circuit and a negative feedback connection between said input circuit and said output circuit, said input circuit having a pair of input terminals, a first pair of spaced electrodes immersed in said electrolyte in a manner whereby the said electrolyte provides an electrical resistance between said first pair of electrodes, means for supplying an alternating voltage to said input circuit, said voltage supplying means comprising an input transformer having a secondary winding portion, means connecting said first pair of electrodes in series with said secondary winding portion between said input terminals, impedance means for deriving an output voltage from said output circuit, said impedance means comprising a feedback transformer having a secondary winding portion, a second electrolyte having the same properties as said first electrolyte and maintained at substantially the same temperature as that of the said first electrolyte, a second pair of spaced electrodes immersed in said second electrolyte in a manner whereby the said second electrolyte provides an electrical resistance between said second pair of electrodes, and means connecting said second pair of electrodes in series with said feedback secondary winding portion in said negative feedback connection between said input terminals, and connecting the electrodes not connected to said winding portions to a point at constant potential.

4. A circuit arrangement for measuring the conductivity of a first electrolyte, comprising an amplifier having an input circuit, and output circuit and a negative feedback connection between said input circuit and said output circuit, said input circuit having a pair of input terminals, a first pair of spaced electrodes immersed in said electrolyte in a manner whereby the said electrolyte provides an electrical resistance between said first pair of electrodes, means for supplying an alternating voltage to said input circuit, means connecting said first pair of electrodes in series with said voltage supply means between said input terminals, impedance means for deriving an output voltage from said output circuit, a conductivity cell, a second electrolyte having the same properties as said first electrolyte, said second electrolyte being stored in said cell, means positioning said cell in proximity to said first pair of electrodes in a manner whereby said second electrolyte is maintained at substantially the same temperature as that of said first electrolyte, a second pair of spaced electrodes immersed in said second electrolyte in a manner whereby the said second electrolyte provides and electrical resistance between said second pair of electrodes, and means connecting said second pair of electrodes in series with said voltage deriving means in said negative feedback connection between said input terminals.

5. A circuit arrangement for measuring the conductivity of a first electrolyte, comprising an amplifier having an input circuit, an output circuit and a negative feedback connection between said input circuit and said output circuit, said input circuit having a pair of input terminals, a first pair of spaced electrodes immersed in said electrolyte in a manner whereby the said electrolyte provides an electrical resistance between said first pair of electrodes, means for supplying an alternating voltage to said input circuit, said voltage supplying means comprising an input transformer having a secondary winding portion, means connecting said first pair of electrodes in series with said secondary winding portion between said input terminals, impedance means for deriving an output voltage from said output circuit, said impedance means comprising a feedback transformer having a secondary winding portion, a conductivity cell, a second electrolyte having the same properties as said first electrolyte, said second electrolyte being stored in said cell, means positioning said cell in proximity to said first pair of electrodes in a manner whereby said second electrolyte is maintained at substantially the same temperature as that of said first electrolyte, a second pair of spaced electrodes immersed in said second electrolyte in a manner whereby the said second electrolyte provides an electrical resistance between said second pair of electrodes, and means connecting said second pair of electrodes in series with said feedback secondary winding portion in said negative feedback connection between said input terminals, and means connecting the electrodes not connected to said winding portions to a point at constant potential.

6. A circuit arrangement for measuring the difference in conductivity of first and second electrolytes, comprising an amplifier having an input circuit, an output circuit and a negative feedback connection between said input circuit and said output circuit, said input circuit having a pair of input terminals, a first pair of spaced electrodes immersed in the first of said electrolytes in a manner whereby said first electrolyte provides an electrical resistance between said first pair of electrodes, a second pair of spaced electrodes immersed in the second of said electrolytes in a manner whereby said second electrolyte provides an electrical resistance between said second pair of electrodes, means for supplying and alternating voltage to said input circuit, said voltage supplying means comprising an input transformer having first and second substantially equal secondary winding portions means connecting said first pair of electrodes in series with said first secondary winding portion between said input terminals, means connecting said second pair of electrodes in series with said second secondary winding portion between said input terminals, the voltage across said second pair of electrodes being in phase opposition to that across said first pair of electrodes, impedance means for deriving an output voltage from said output circuit, said impedance means comprising a feedback transformer having a secondary winding portion, a third electrolyte, a third pair of spaced electrodes immersed in said third electrolyte in a manner whereby the said third electrolyte provides an electrical resistance between said third pair of electrodes, means connecting said third pair of electrodes in series with said feedback secondary winding portion in said negative feedback connection between said input terminals, and means connecting the electrodes not connected to said winding portions to a point at constant potential.

7. A circuit arrangement for measuring a variation in a first resistance, comprising an amplifier having an input circuit, an output circuit and a negative feedback connection between said input circuit and said output circuit, said input circuit having a pair of input terminals, means for supplying an alternating voltage to said input circuit, said voltage supplying means comprising an input transformer having a secondary winding with a substantially centrally positioned tapping point thereon, said tapping point being connected to a point at constant potential, means connecting said first resistance in series with at least a portion of said secondary winding between said input terminals, impedance means for deriving an output voltage from said output circuit, said impedance means comprising a feedback transformer having a secondary winding portion, a second resistance, means connecting said second resistance in series with said feedback secondary winding portion in said negative feedback connection between said input terminals, and means connecting the ends of said resistances not connected to said winding portions to one of said input terminals, said first and second resistances being connected in series circuit arrangement with said input secondary winding and said feedback secondary winding portion.

8. A circuit arrangement for measuring a variation in a first resistance, comprising an amplifier having an input circuit, an output circuit and a negative feedback connection between said input circuit and said output circuit, said input circuit having a pair of input terminals, means for supplying an alternating voltage to said input circuit, said voltage supplying means comprising an input transformer having a secondary winding with a substantially centrally positioned tapping point thereon, said tapping point being connected to a point at constant potential, means connecting said first resistance in series with at least a portion of said secondary winding between said input terminals, impedance means for deriving an output voltage from said output circuit, said impedance means comprising a feedback transformer having a secondary winding with a tapping point positioned thereon, a second resistance, means connecting said second resistance to said feedback secondary winding tapping point in said negative feedback connection between said input terminals whereby the said second resistance is connected in series with at least a portion of said feedback secondary winding, and means connecting the ends of said resistances not connected to said winding portions to one of said input terminals, said first and second resistances being connected in series circuit arrangement with said input secondary winding and at least a portion of said feedback secondary winding.

References Cited in the file of this patent

UNITED STATES PATENTS

| | | |
|---|---|---|
| 2,490,579 | Clewell | Dec. 6, 1949 |
| 2,622,192 | Tarpley | Dec. 16, 1952 |
| 2,674,719 | Williams | Apr. 6, 1954 |
| 2,719,262 | Bousman | Sept. 27, 1955 |
| 2,752,433 | White et al. | June 26, 1956 |
| 2,925,554 | Hayes | Feb. 16, 1960 |

OTHER REFERENCES

"Operational Bridge Gages High Capacitance (Konigsberg); Electronics, January, 1957; pages 175–177.

UNITED STATES PATENT OFFICE
CERTIFICATE OF CORRECTION

October 2, 1962

Patent No. 3,056,919

Pieter Geert Kuipers

It is hereby certified that error appears in the above numbered patent requiring correction and that the said Letters Patent should read as corrected below.

Column 4, line 65, after "and" insert -- means --.

Signed and sealed this 26th day of March 1963.

(SEAL)
Attest:

ESTON G. JOHNSON
Attesting Officer

DAVID L. LADD
Commissioner of Patents